United States Patent [19]

Katsumata et al.

[11] Patent Number: 5,280,732
[45] Date of Patent: Jan. 25, 1994

[54] COLUMN TYPE CHANGE LEVER MECHANISM FOR AUTOMATIC TRANSMISSION IN AUTOMOTIVE VEHICLE

[75] Inventors: Masato Katsumata, Toyota; Motoharu Akiyama, Chiryu, both of Japan

[73] Assignees: Toyota Jidosha Kabushiki Kaisha, Toyota; Banno Kogyo Kabushiki Kaisha, Anjo, both of Japan

[21] Appl. No.: 981,310

[22] Filed: Nov. 25, 1992

[30] Foreign Application Priority Data

Nov. 26, 1991 [JP] Japan .................. 3-310967

[51] Int. Cl.$^5$ ............................ B62D 1/18
[52] U.S. Cl. ................... 74/473 SW; 74/485
[58] Field of Search .......... 74/473 P, 473 SW, 484 R, 74/485, 486, 487, 493

[56] References Cited

U.S. PATENT DOCUMENTS

| | | | |
|---|---|---|---|
| 4,261,282 | 4/1981 | Satou et al. | 74/473 SW X |
| 4,267,743 | 5/1981 | Tanaka | 74/473 SW |
| 4,762,015 | 8/1988 | Katayama | 74/473 SW |
| 4,805,476 | 2/1989 | Beauch et al. | 74/475 X |
| 4,993,278 | 2/1991 | Nakanishi | 74/473 SW X |
| 5,065,641 | 11/1991 | Yamamoto et al. | 74/473 SW |

FOREIGN PATENT DOCUMENTS 62-105773  5/1987  Japan .
62-105774  5/1987  Japan .

Primary Examiner—Leslie A. Braun
Assistant Examiner—William O. Trousdell
Attorney, Agent, or Firm—Oblon, Spivak, McClelland, Maier & Neustadt

[57] ABSTRACT

A column type change lever mechanism mounted on a tiltable steering shaft assembly having an upper steering column arranged to be tiltable upwardly or downwardly at a tilt center axis. The column type change lever mechanism is composed of a shift arm rotatably mounted on the upper steering column, a manual change lever connected to the shift arm to be operated for rotating the shift arm, a bell crank mounted on the upper steering column in such a manner as to be rotatable about an axis perpendicular to the tilt center axis and a central axis of the upper steering column and having a first arm pivoted to the shift arm and a second arm pivotally connected to one end of a forwardly extending push-pull cable the other end of which is operatively connected to an automatic transmission of an automotive vehicle.

3 Claims, 5 Drawing Sheets

COLUMN TYPE CHANGE LEVER MECHANISM FOR AUTOMATIC TRANSMISSION IN AUTOMOTIVE VEHICLE

BACKGROUND OF THE INVENTION

1. Field of the Invention

The present invention relates to a column type change lever mechanism mounted on a tiltable steering shaft assembly for selecting the operation mode of an automatic transmission in an automotive vehicle.

2. Description of the Prior Art

In Japanese Patent Laid-open Publication No. 62-105773, there has been proposed a column type change lever mechanism which includes a tiltable column change rod assembled in parallel with a tiltable steering shaft assembly. The column change rod is composed of an upper rod portion tiltably connected to a lower rod portion by means of a universal joint, while the steering shaft assembly is composed of an upper steering shaft tiltably connected to a lower steering shaft by means of a universal joint and rotatably supported within an upper column tube. The upper portion of the column change rod is mounted on a side portion of the upper column tube of the steering shaft assembly by means of a support bracket and is provided thereon with a manual change lever. In the column type change lever mechanism, the operation grip of the manual change lever is spaced from the central axis of the upper column tube in a distance between the upper portion of the column change rod and the upper column tube, and the component parts such as the column change rod, the manual change lever and the support bracket are arranged in a limited space at the side portion of the upper column tube. With such an arrangement of the column type change lever mechanism as described above, it is difficult to provide the manual change lever in an optimum length suitable for operation, and it is also difficult to assemble the component parts of the change lever mechanism with tiltable steering shaft assembly in the limited space. In the case that a collision energy absorbing mechanism is assembled with the steering shaft assembly, it is required to further assemble a collision energy absorbing mechanism with the column change rod, resulting in a complicated construction and an increase of manufacturing cost.

SUMMARY OF THE INVENTION

It is, therefore, a primary object of the present invention to provide an improved column type change lever mechanism the component parts of which can be mounted on a tiltable steering shaft assembly in a simple construction without causing any problems described above.

According to the present invention, the object is accomplished by providing a column type change lever mechanism mounted on a tiltable steering shaft assembly having an upper steering column arranged to be tiltable upwardly or downwardly at a tilt center axis, which comprises a shift arm rotatably mounted on the upper steering column, a manual change lever connected to the shift arm to be operated for rotating the shift arm, a bell crank mounted on the upper steering column in such a manner as to be rotatable about an axis perpendicular to the tilt center axis and a central axis of the upper steering column and having a first arm pivoted to the shift arm and a second arm pivotally connected to one end of a forwardly extending push-pull cable the other end of which is operatively connected to an automatic transmission of an automotive vehicle.

BRIEF DESCRIPTION OF THE DRAWINGS

Other objects, features and advantages of the present invention will be readily appreciated from the following detailed description of a preferred embodiment thereof when taken together with the accompanying drawings, in which.

DESCRIPTION OF THE PREFERRED EMBODIMENT

Figure 1:
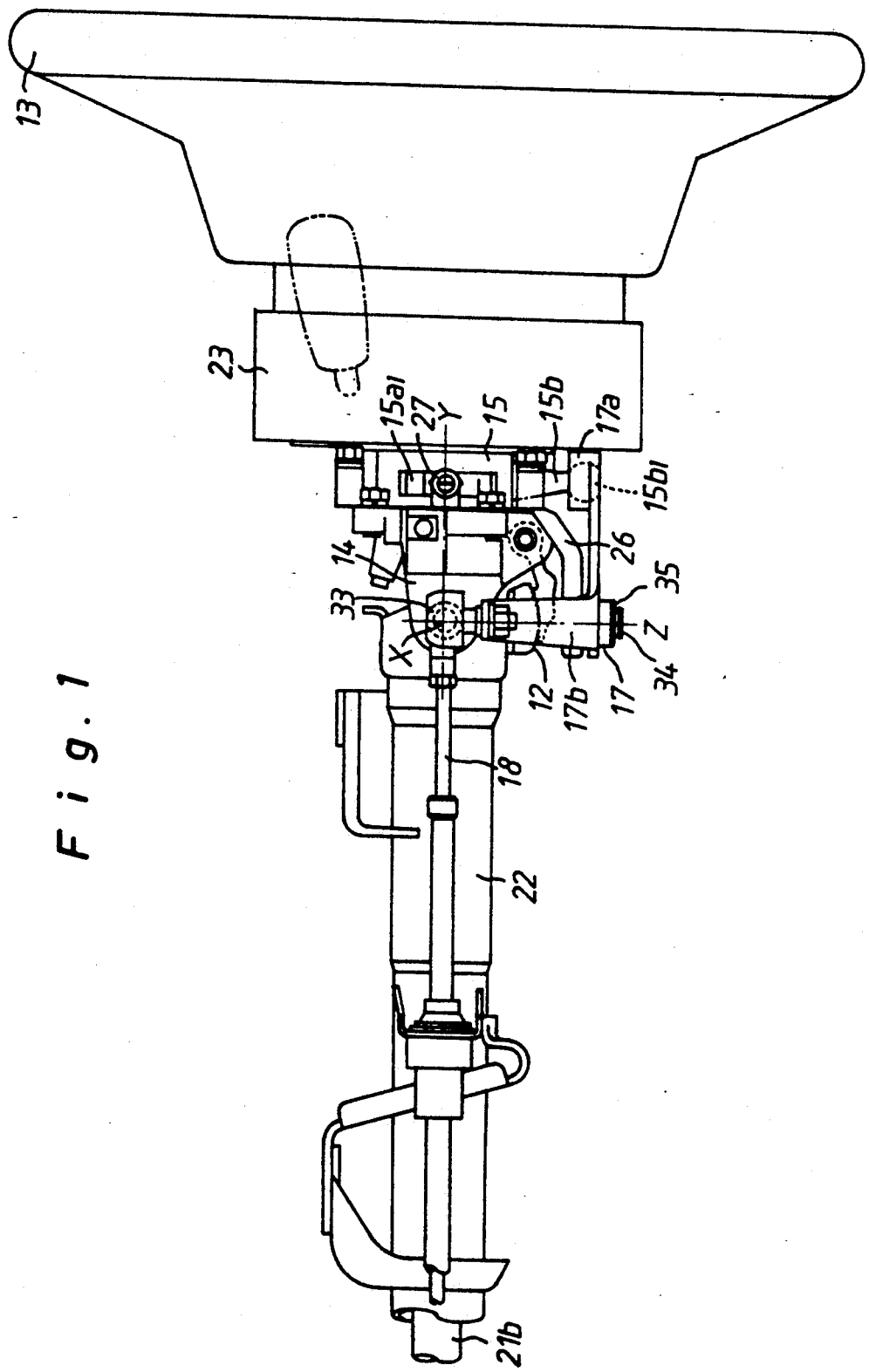
FIG. 1 is a side view of a tiltable steering shaft assembly provided with a column type change lever mechanism according to the present invention.
Figure 2:
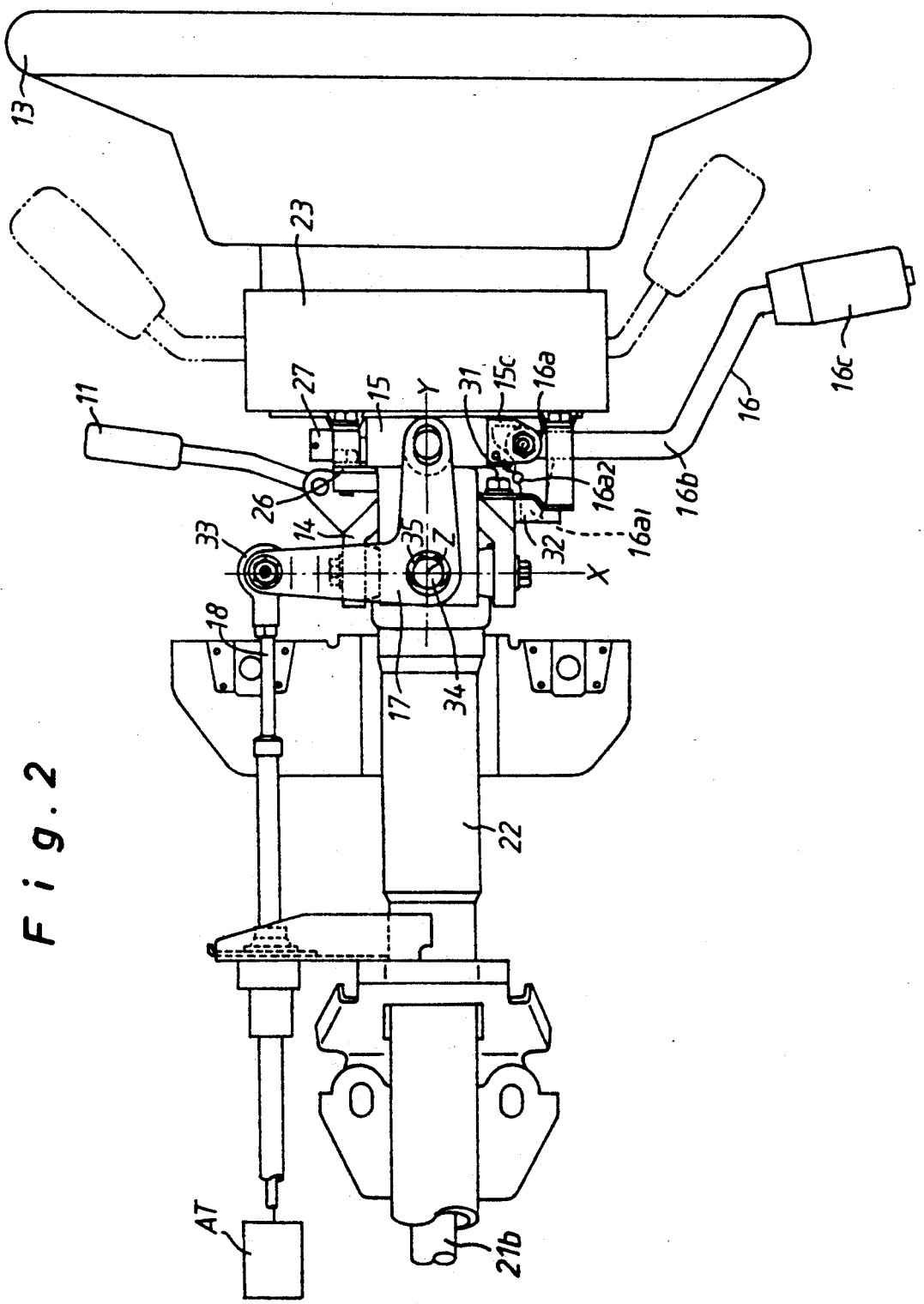
FIG. 2 is a bottom view of the tiltable steering shaft assembly shown in FIG. 1.
Figure 3:
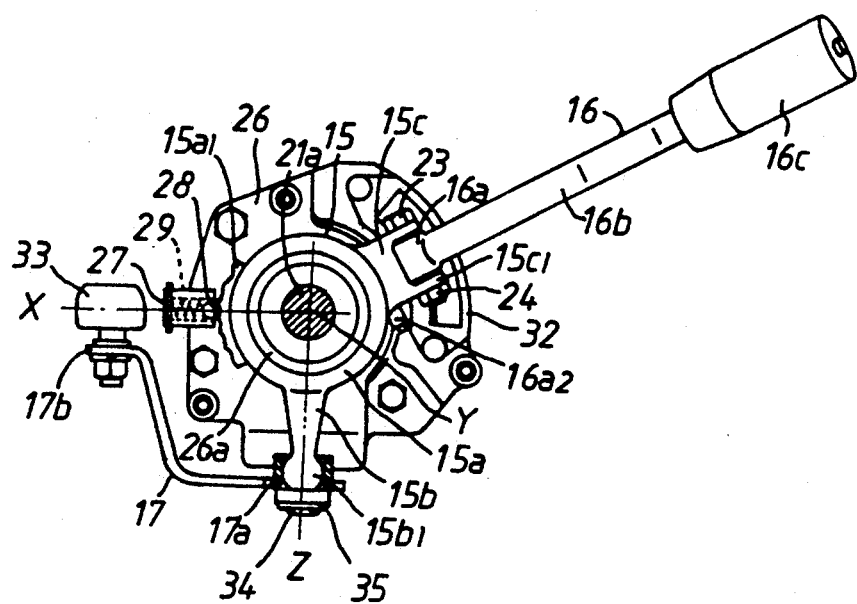
FIG. 3 is a partly sectioned front view illustrating a support member, a shift arm, a manual change lever and a bell-crank shown in FIG. 1.

In FIGS. 1 and 2 of the drawings, there is illustrated a tiltable steering column assembly provided with a column type change lever mechanism according to the present invention. The tiltable steering column assembly includes an upper steering column 14 arranged to be tiltable upwardly or downwardly in a condition where a lock mechanism 12 has been released by operation of a manual tilt lever 11. The column type change lever mechanism includes a shift arm 15, a manual change lever 16 and a bell-crank 17. As shown in FIG. 3, an upper steering shaft 21a is rotatably mounted within the upper steering column 14 and provided thereon with a steering wheel 13 for rotation therewith. The upper steering shaft 21a is provided at its tilt center with a universal joint (not shown) for connection with the upper end of a lower steering shaft 21b. The upper steering column 14 is connected at its lower end to the upper end of a lower steering column 22 mounted on a vehicle body structure (not shown) to be rotatable about a tilt center axis X and is provided thereon with a combination switch assembly 23.

As shown in FIG. 3, the shift arm 15 of the column type change lever mechanism has an annular body portion 15a integrally provided with a detent plate $15a_1$, an output arm portion 15b formed with a ball joint $15b_1$ for connection with a first arm 17a of the bell crank 17, and an input arm portion 15c formed with a U-letter shaped joint portion $15c_1$ on which the manual change lever 16 is mounted at its base end portion 16a by means of a bolt 23 and a nut 24 to be rotatable about the bolt 23. The annular body portion 15a of shift arm 15 is rotatably assembled with a tubular portion 26a of the support member 26. (see FIGS. 5 and 6) As shown in FIGS. 1 and 2, the support member 26 is secured to the upper steering column 14 in such a manner that the tubular portion 26a of support member 26 is coaxially coupled with the upper steering column 14. As shown in FIG. 3, a ball 28 is received by a tubular holder 27 secured to the support member 26 and is loaded by a compression spring 29 for resilient engagement with the detent plate 15$a_1$. In shifting operation of the manual change lever 16, the spring loaded ball 29 cooperates with the detent plate 15$a_1$ to afford a selection feel to the operator and to retain the change lever 16 at a selected position.

Figure 4A:
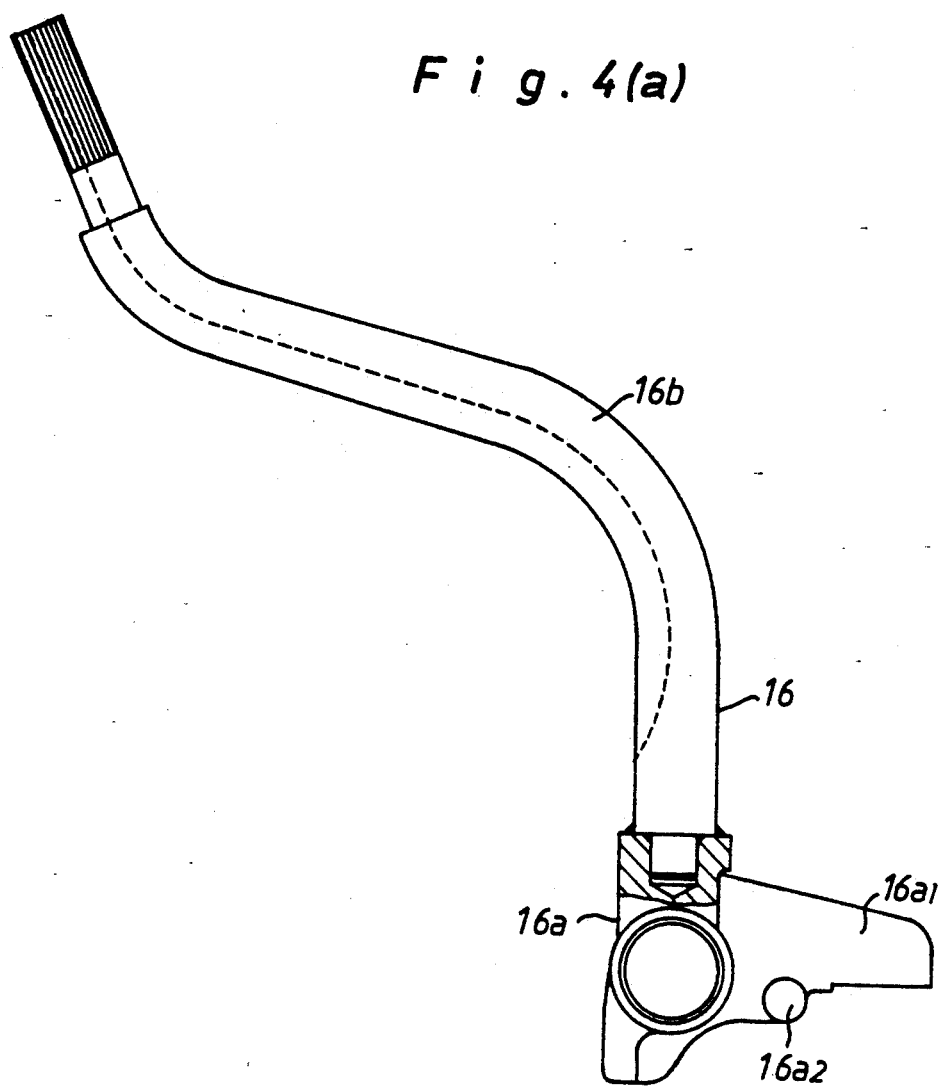
FIG. 4(a) is an enlarged plan view of the manual change lever shown in FIG. 1.
Figure 4B:
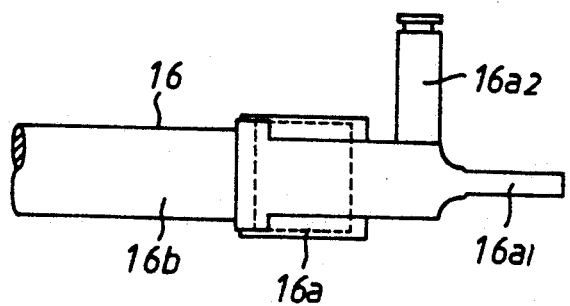
FIG. 4(b) is an enlarged front view of the manual change lever shown in FIG. 1.
Figure 5:
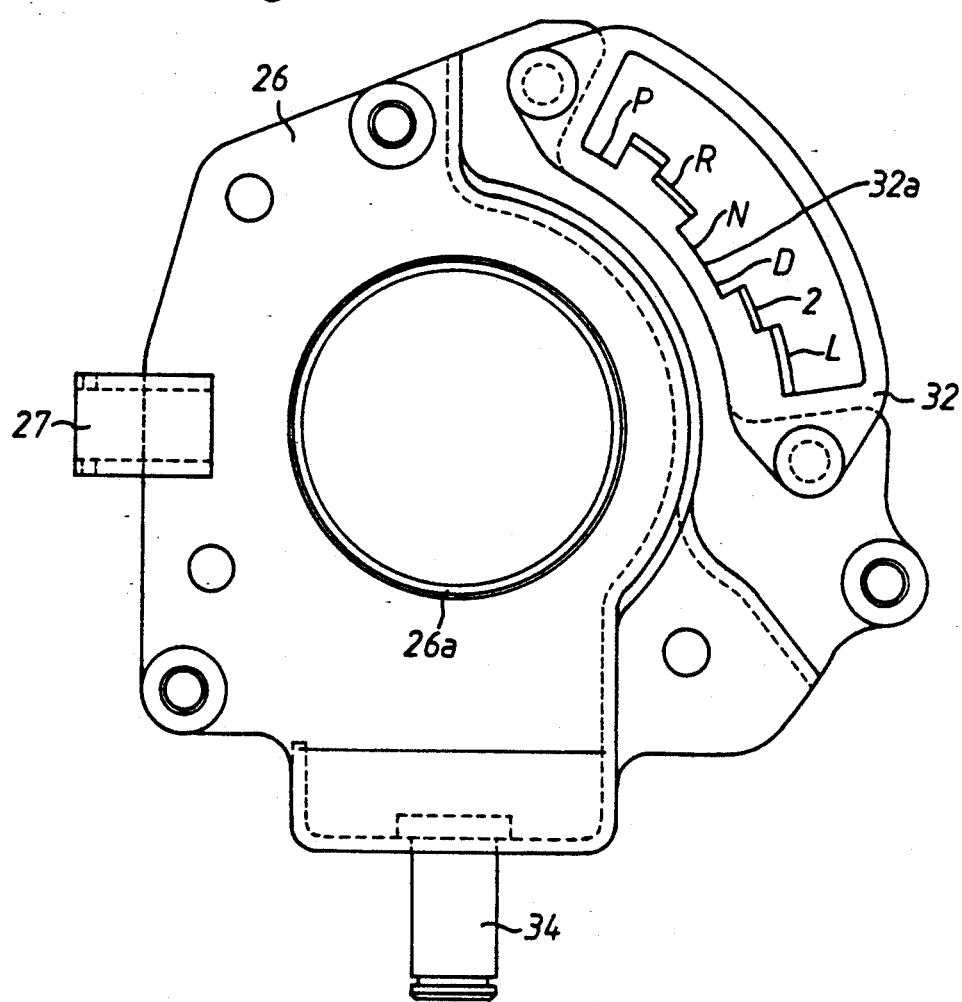
FIG. 5 is an enlarged front view of the support member shown in FIG. 3.
Figure 6:
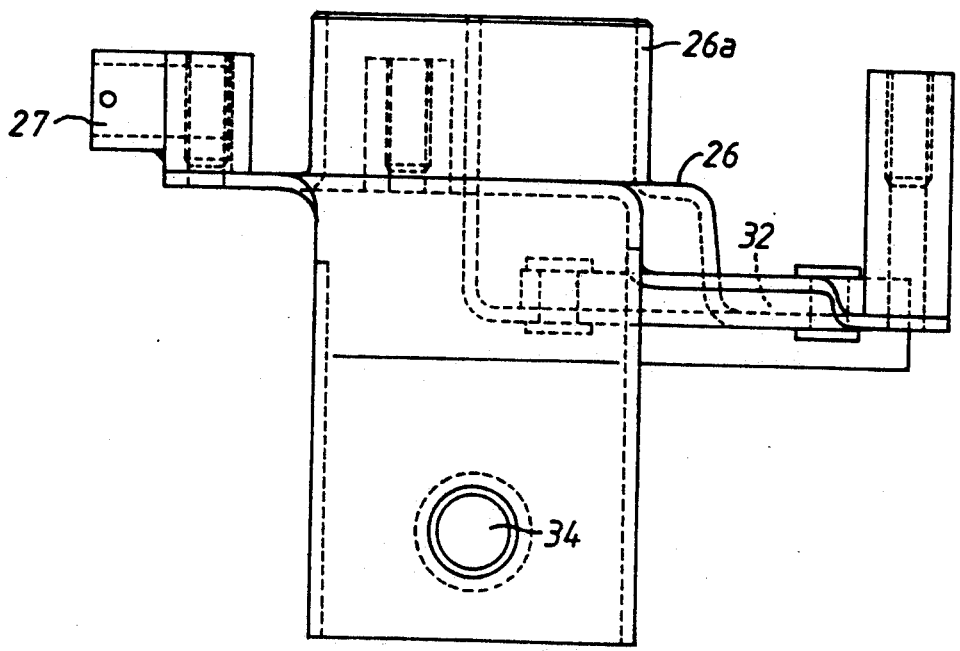
FIG. 6 is an enlarged bottom view of the support member shown in FIG. 3.

As shown in FIGS. 3, 4(a) and 4(b), the manual change lever 16 is integrally provided at its base end portion 16$a$ with a lock arm 16$a_1$ and a retainer pin 16$a_2$ and has an arm portion 16$b$ secured to its base end portion 16$a$ and an operation grip 16$c$ secured to the outer end of arm portion 16$b$. As shown in FIG. 2, a tension coil spring 31 is engaged at its one end with the retainer pin 16$a_2$ of change lever 16 and at its other end with the input arm portion 15$c$ of shift arm 15 to bias the lock arm 16$a_1$ of change lever 16 toward recessed surfaces 32$a$ of a shift position plate 32 secured to the support member 26 for resilient engagement therewith. (see FIG. 5) As shown in FIG. 5, the recessed surfaces 32$a$ of shift position plate 32 are formed to provide a parking position P, a reverse position R, a neutral position N, a drive position D, a second position 2 and a low range position L. When shifted from the neutral position P to the reverse position R or the parking position P or shifted from the drive position D to the second position 2 or the low range position L, the manual change lever 16 is operated against the load of spring 31 to be retained at a selected position.

The bell crank 17 is pivotally connected at its first arm 17$a$ to the output arm portion 15$b$ of shift arm 15 through the ball joint 15$b_1$ and has a second arm 17$b$ pivotally connected to the rear end of a forwardly extending push-pull cable 18 through a ball joint 33 at a position located on the tilt center axis X. The bell crank 17 is rotatably mounted on a support pin 34 which is secured to the support member 26 and arranged along a vertical axis Z perpendicular to the tilt center axis X and the central axis Y of upper steering column 14. A retainer clip 35 is fixed to the support pin 34 to retain the bell crank 17 in place. In such an arrangement as described above, the bell crank 17 acts to transmit rotation of the shift arm 15 to the push-pull cable 18 for selecting the operation mode of an automatic transmission of the vehicle.

Assuming that the manual change lever 16 is operated to rotate the shift arm 15 about the central axis Y of upper steering column 14 in a desired amount, the bell crank 17 is rotated about the vertical axis Z to move the push-pull cable 18 in a fore-and-aft direction for selecting the operation mode of the automatic transmission. When the upper steering column 14 is tilted with the steering wheel 13 upwardly or downwardly, the manual change lever 16, shift arm 15 and bell crank 17 are moved with the upper steering column 14. In this instance, the bell crank 17 is rotated about the tilt center axis X so that the push-pull cable 18 is remained in place without any movement.

Since in the column type change lever mechanism the manual change lever 16 is connected to the shift arm 15 rotatably mounted on the upper steering column 14, the manual change lever 16 can be provided in an optimum length suitable for operation without any problem. The component parts such as the shift arm 15, manual change lever 16, bell crank 17 and push-pull cable 18 can be assembled with the tiltable steering shaft assembly without any problem for mounting space thereof. Since the push-pull cable 18 is arranged to be flexible at its intermediate portion, a collision energy absorbing mechansim can be assembled with the tiltable steering shaft assembly in a simple construction without providing any other energy absorbing mechanism on the column type change lever mechanism.

What is claimed is:

1. A column type change lever mechanism mounted on a tiltable steering shaft assembly having an upper steering column arranged to be tiltable upwardly or downwardly at a tilt center axis, comprising a shift arm rotatably mounted on said upper steering column, a manual change lever connected to said shift arm to be operated for rotating said shift arm, a bell crank mounted on said upper steering column in such a manner as to be rotatable about an axis perpendicular to the tilt center axis and a central axis of said upper steering column and having a first arm pivoted to said shift arm and a second arm pivotally connected to one end of a forwardly extending push-pull cable the other end of which is operatively connected to an automatic transmission of an automotive vehicle.

2. A column type change lever mechanism as recited in claim 1, wherein a support member is secured to said upper steering column, said support member having a tubular portion coaxially coupled with said upper steering column and being provided thereon with a shift position plate, and wherein said shift arm is rotatably mounted on the tubular portion of said support member and said manual change lever has a base end portion provided with a lock arm for engagement with said shift position plate.

3. A column type change lever mechanism as recited in claim 2, wherein a detent mechanism is mounted on said support member to retain said manual change lever at a selected position.

* * * * *